Feb. 3, 1959   R. J. SINGER ET AL   2,871,622
AUTOMATIC FILAMENT CUTTER
Filed Feb. 26, 1954   7 Sheets-Sheet 1

INVENTORS.
ROBERT J. SINGER
EDWARD N. LICHTENBERG
BY
Donald S. Cohen
ATTORNEY

Feb. 3, 1959  R. J. SINGER ET AL  2,871,622
AUTOMATIC FILAMENT CUTTER
Filed Feb. 26, 1954  7 Sheets-Sheet 2

INVENTORS.
ROBERT J. SINGER
EDWARD N. LICHTENBERG
BY
Donald S. Cohen
ATTORNEY

Feb. 3, 1959 R. J. SINGER ET AL 2,871,622
AUTOMATIC FILAMENT CUTTER
Filed Feb. 26, 1954 7 Sheets-Sheet 3

INVENTORS
ROBERT J. SINGER
EDWARD N. LICHTENBERG

BY Donald S. Cohen
ATTORNEY

Feb. 3, 1959     R. J. SINGER ET AL     2,871,622
AUTOMATIC FILAMENT CUTTER

Filed Feb. 26, 1954     7 Sheets-Sheet 6

INVENTORS.
ROBERT J. SINGER
EDWARD N. LICHTENBERG
BY

Donald S. Cohen
ATTORNEY

INVENTORS
ROBERT J. SINGER
EDWARD N. LICHTENBERG
BY
*Donald S. Cohen*
ATTORNEY

United States Patent Office 2,871,622
Patented Feb. 3, 1959

2,871,622

AUTOMATIC FILAMENT CUTTER

Robert J. Singer, Philadelphia, Pa., and Edward N. Lichtenberg, Pennsauken, N. J., assignors to International Resistance Company, Philadelphia, Pa.

Application February 26, 1954, Serial No. 412,677

2 Claims. (Cl. 49—48)

This invention relates to an apparatus for severing a length of continuously moving frangible filament into short lengths. Such filament may conveniently take the form of a glass rod or tubing having a resistance coating and the invention is designed to break such a filament into lengths suitable for use in individual resistance units.

Heretofore, apparatus of this general character consisted essentially of means for continuously feeding a frangible filament past a rotating scoring tool which moved longitudinally with the filament and laterally thereagainst to provide a score mark on the filament and means for engaging the filament beyond the score mark to snap sever it at the score mark over a stationary fulcrum. Because such apparatus requires a multiple of driving arrangements for rotating the scoring tool, moving it with the filament and laterally against the filament it is unduly complicated and hence subject to breakdown. Furthermore it is difficult to obtain a clean, sharp break of the filament where using a stationary fulcrum since the timing of the snap severing operation must be critical to take place exactly at the time when the score mark is aligned with the end of the fulcrum.

It is therefore an object of this invention to provide a frangible severing apparatus having a simple mechanism for translating a scoring tool transversely across and longitudinally with the filament to provide a score mark thereon. Another object is to provide a frangible filament severing apparatus having a moving anvil supporting the filament at the point of scoring during both the scoring and severing operations to provide a clean, sharp break of the filament. Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 1:
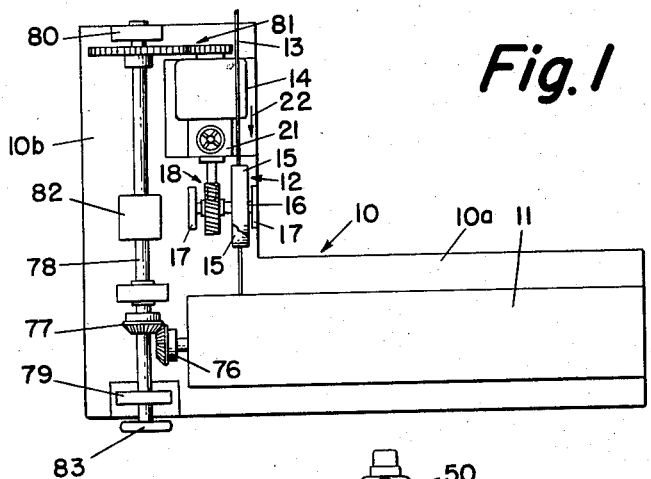
Figure 1 is a top plan view of the machine with certain parts broken away.

Referring to the drawings in which similar parts in the several views bear like numerals, Figure 1 shows the filament cutter which comprises an L-shaped base plate 10, a cutter mechanism 11 mounted along one leg 10a of the base plate 10, a feeding mechanism 12 mounted on the other leg 10b of the base plate 10 for feeding the filament 13 into the cutter mechanism 11, and a drive motor 14 mounted on the other leg 10b of the base plate for actuating the cutter mechanism and the filament feeding mechanism. The filament feeding mechanism 12 comprises a pair of vertically superimposed rollers 15 each mounted on shafts 16 supported in brackets 17—17 on the base plate 10. Shafts 16 are driven by motor 14 through a variable drive device 21 and suitable gearing mechanism generally indicated at 18. Motor 14 through rollers 15 drives the filament 13, fed therebetween in the direction of arrow 22 toward the cutter mechanism to be described.

The construction and operation of the cutter mechanism 11 may be very generally described by reference to Figure 7. A filament 13 is fed from left to right through the guide 56 where it is scored by the scoring tool 46 as it continues to move. This scoring is carried out by the rod 37 which is reciprocated longitudinally, crosswise of the filament as indicated by the arrow and also pivoted about the axis of pin 33. Thus, as the scoring tool crosses the filament for scoring, it travels, because of such pivoting action, with the filament so as not to impede the continuous feeding thereof. To support the filament for such scoring, there is an anvil 53 reciprocably disposed beneath the path of the filament. At the proper time this anvil moves up to support the filament during scoring and during the snap severing. Upon completion of the etching, the filament extends from the right end of the support 53 where it is hit by the pin 59 which is rocked with the shaft 58 by cam 70. Accordingly, the filament 13 is continuously fed through the machine and scored at desired intervals to provide desired lengths and such lengths are snap severed without impeding the progress of the filament through the machine.

Figure 2:
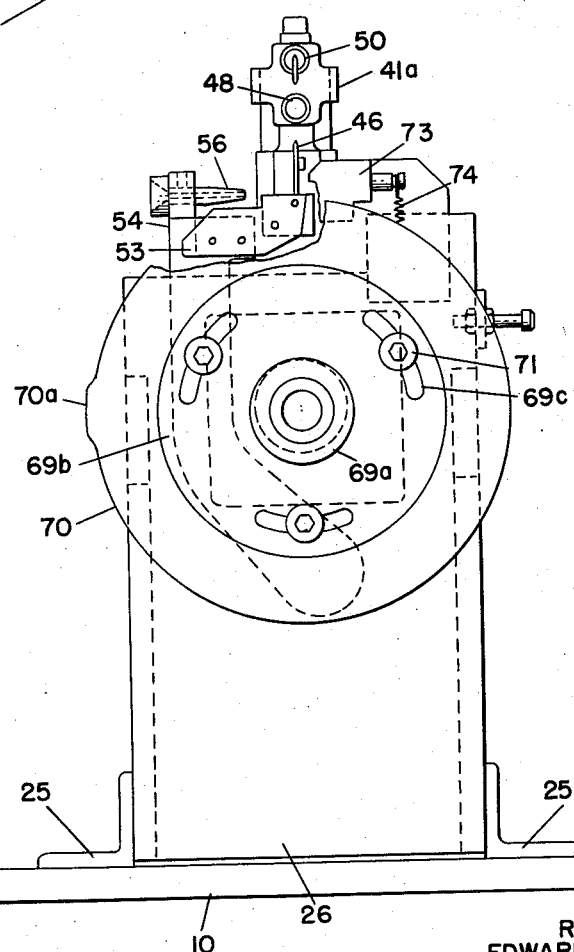
Figure 2 is a front elevational view of a part of the machine.
Figure 3:
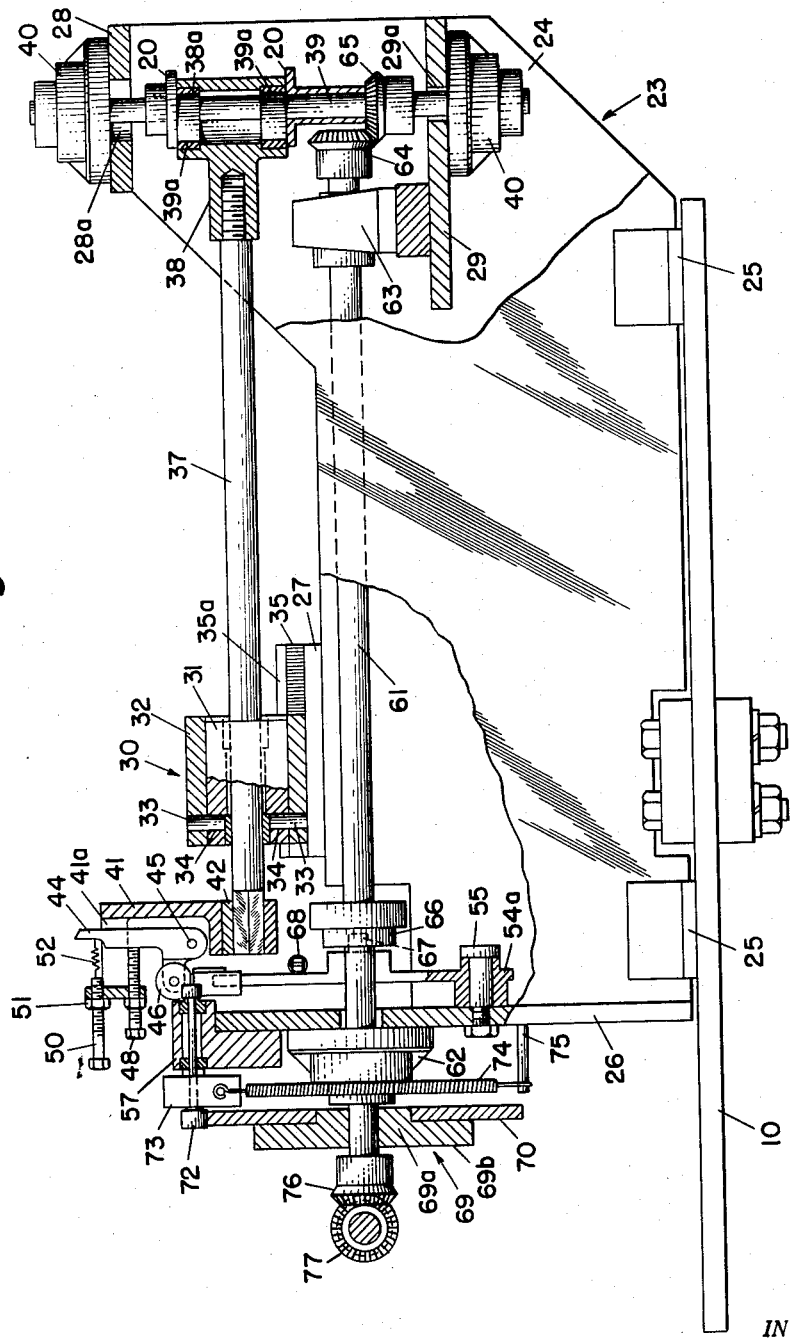
Figure 3 is a side elevational view of the part of the machine shown in Figure 2 with parts broken away and in section.

Referring to Figures 2 to 7 inclusive, the cutter mechanism 11 comprises a mounting frame 23 (Figure 3) on the base plate 10 substantially normal to the path of the filament 13. The mounting frame has a pair of side walls 24—24 (Figure 4), each attached to the base plate 10 by brackets 25, a front end wall 26 and a top bridging plate 27 (Figures 3 and 4) adjacent the front end wall but spaced rearwardly therefrom. A second top bridging plate 28 extends across the rear end of the frame, and a ledge 29 extends (Figure 3) parallel therewith but is vertically spaced below bridging plate 28. As best seen in Figure 3 bearing 30 is supported on the front bridging plate 27 and comprises a bearing sleeve 31 within a casing 32. The sleeve 31 is narrower than the inside width of casing 32 and a pair of vertically aligned pivot pins 33—33 extend through the casing into holes 34—34 in the sleeve so that the sleeve can pivot horizontally within the casing. Flanges 32a extending horizontally from the bottom of casing 32 and are slidably supported on bridging plate 27 by guide rails 35 having flanges 35a extending inwardly. Thus bearing 30 is slidable crosswise of the bridging plate 27 or left and right as viewed in Figure 3; it may be locked in any position in track 35 by set screws 36 extending through flanges 35a.

Figure 4:
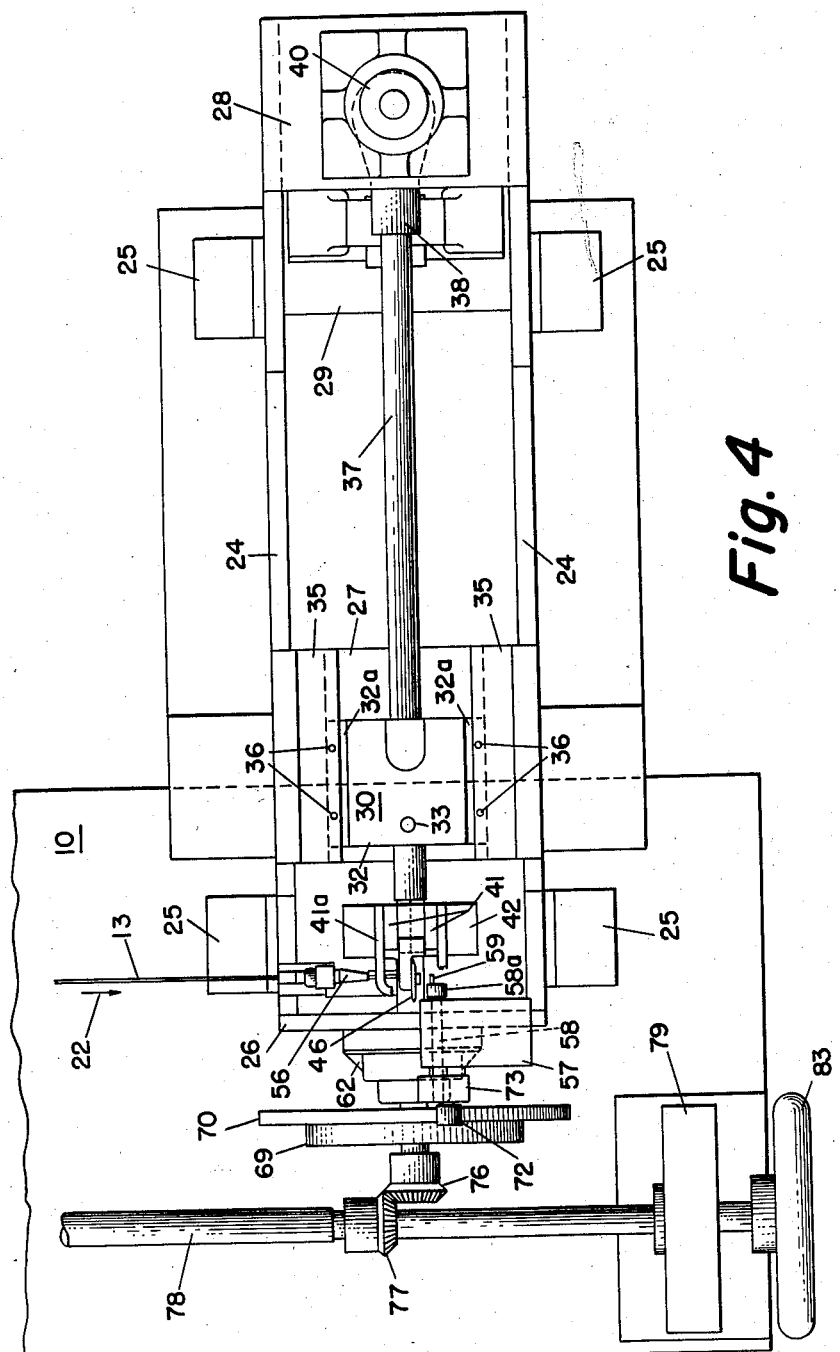
Figure 4 is a top plan view of the part of the machine shown in Figure 3 with parts broken away.

Still referring to Figures 3 and 4, a reciprocatory rocker arm 37 is supported between its ends in the bearing 30 having a bearing sleeve 38 threaded on its rear end. Extending through the bearing sleeve 38 is a shaft 39 having a pair of eccentrics 39a engaging the inner surface 38a of the bearing sleeve. The ends of the shaft 39 extend through holes 28a and 29a in plate 28 and ledge 29 respectively and are supported in bearings 40—40 attached thereto. A pair of collars 20 on shaft 39 support sleeve 38 in its position shown in Figure 3, thus rotation of shaft 39 will cause the rocker arm 37 to reciprocate eccentrically. A scoring tool bracket 41 is attached to the front end of rocker arm 37 by clamping blocks 42 and 43. The front end of the rocker arm 37 and the inside of the clamping blocks are squared to prevent rotation of the scoring tool bracket 41 on the rocker arm.

Figure 5:
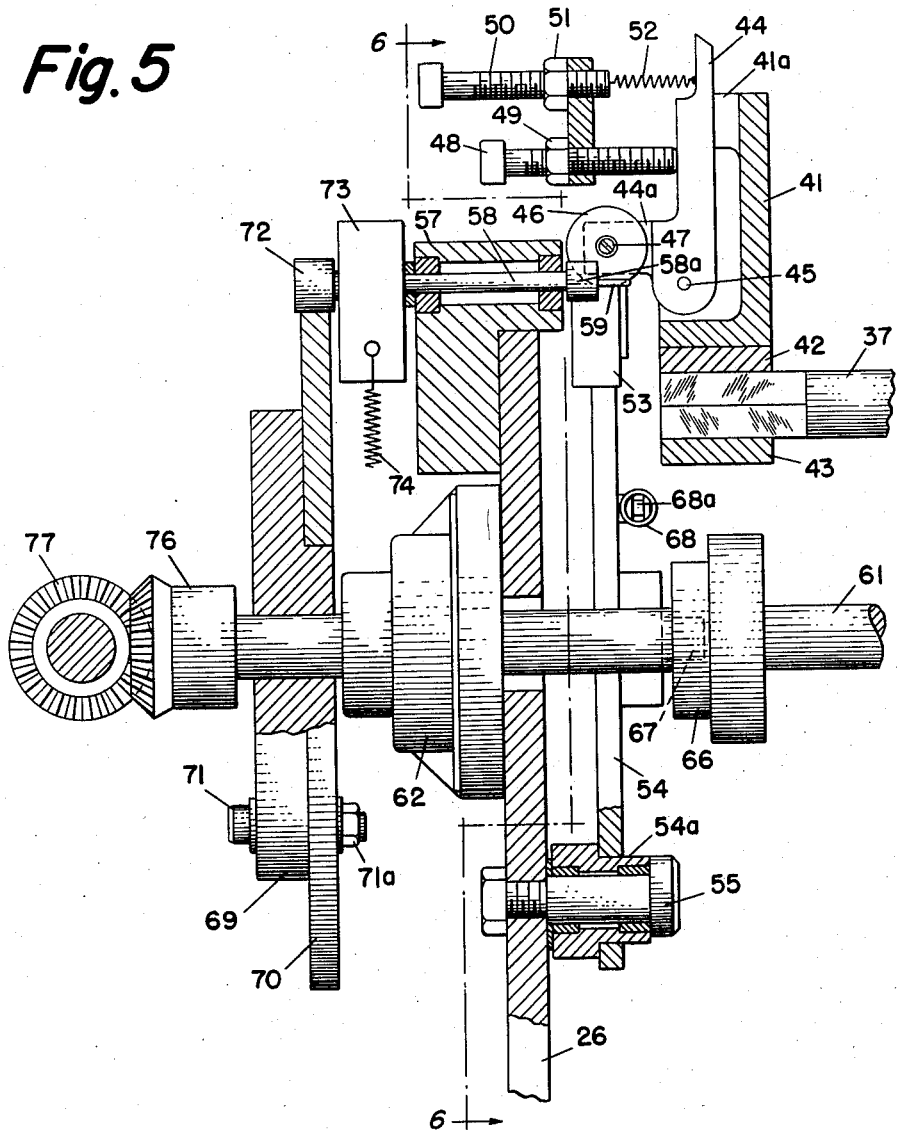
Figure 5 is a section of the side elevational view on an enlarged scale.

A scoring tool mounting arm 44 is pivotally mounted on the scoring tool bracket 41 by a pivot pin 45. Arm 44 has a horizontally extending arm 44a to which is attached by screw 47 (Figure 5) the scoring tool 46, in the form of a cutting disk. Even though the scoring tool 46 is shown to be circular it can be of any shape such as square as long as it has a sharp cutting edge along its bottom side. The scoring tool bracket 41 has a horizontally disposed U-shaped arm 41a surrounding the upper part of the scoring tool mounting arm 44. Threaded through the bottom of the U-shaped arm 41a and abutting the scoring tool mounting arm 44 is a scoring tool adjustment pin 48 (Figure 5). A lock nut 49 is provided on the adjustment pin 48 to hold the pin in any desired position. A second pin 50 having a locknut 51 is also threaded through the bottom of the U-shaped arm and a spring 52 under tension is connected between the end of the second pin 50 and the scoring tool mounting arm 44 to hold the arm against the adjustment pin 48. Thus by threading the adjustment pin 48 in or out the scoring tool mounting arm 44 is pivoted on pivot pin 45 and the lowermost position of the scoring tool 46 may be determined.

Figure 6:
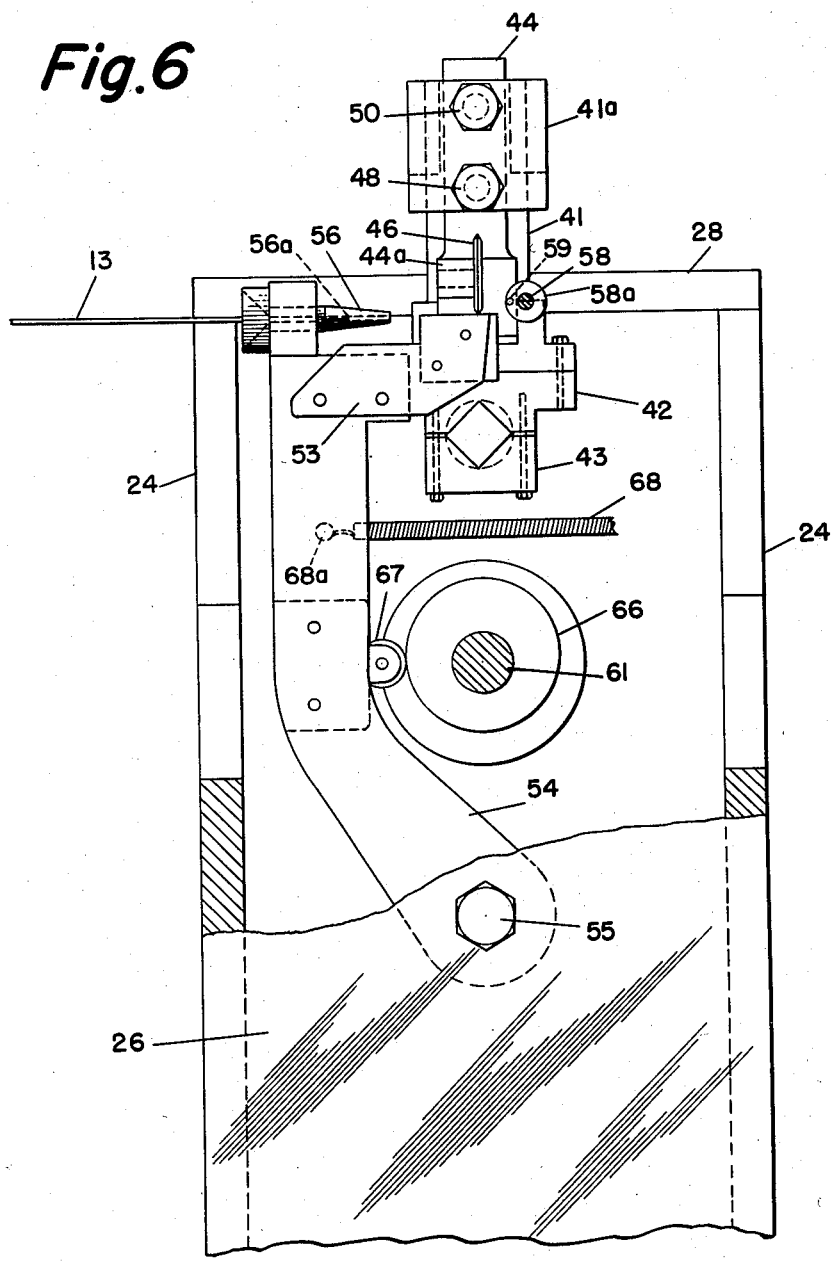
Figure 6 is a sectional view along line 6—6 of Figure 5 looking in the direction of the arrows.
Figure 8:
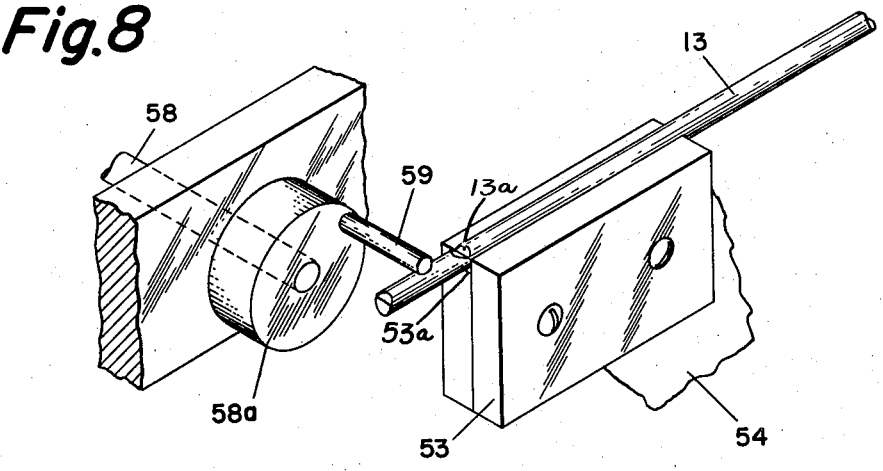
Figure 8 is a view of the scored filament just prior to being snap severed.
Figure 9:
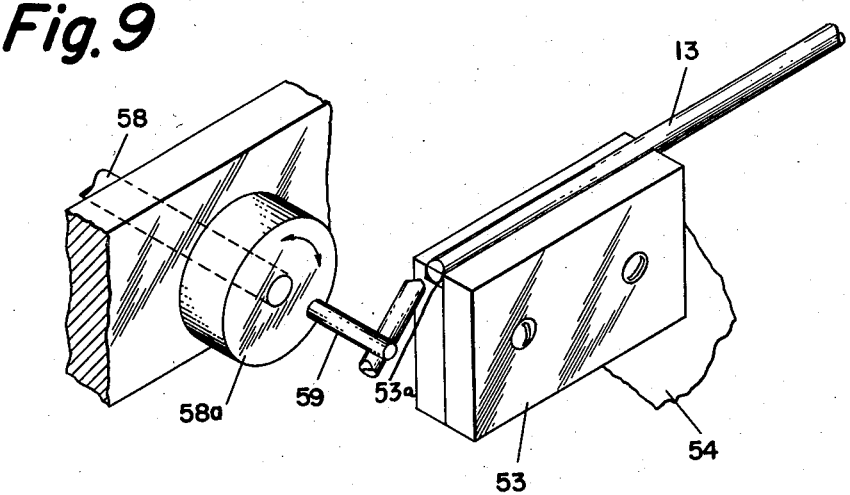
Figure 9 is a view showing the filament just after being snap severed.

Beneath the scoring tool 46 is a filament supporting anvil 53 (Figures 2, 5 and 6) preferably having a groove (Figures 8 and 9) in its upper surface through which the filament 13 travels. Anvil 53 is mounted on lever 54 the lower end of which has a bearing 54a (Figure 3) on a pin 55 secured to front end wall 26 of the mounting frame 23. The mounting of the lever 54 on the end wall 26 is such that the anvil 53 pivots in a vertical plane passing through the path of travel of the filament 13. Mounted on the upper end of lever 54 to the left of the anvil 53 as seen in Figure 6 and hence in the path of travel of the filament 13 is a filament guide 56. Guide 56 has a passage 56a in line with the path of the filament to guide the filament over the anvil and which is slightly larger in diameter than the diameter of the filament so that the guide will not excessively bend the filament as the guide pivots with the lever 54.

A break-off mechanism is mounted on the front end wall 26 of the mounting frame 23 beyond the scoring tool in the path of travel of the filament 13 and comprises a bearing 57 (Figure 3) mounted on the front end wall 26, a break-off shaft 58 rotatably supported in the bearing and extending transversely of the path of travel of the filament, an enlarged head 58a on the end of the break-off shaft 58 adjacent the path of the filament and a break-off pin 59 etxending from the enlarged head 58a transversely of the path of the filament. Break-off pin 59 is mounted eccentric to the axis of shaft 58 and to the side thereof nearest the scoring tool so that rotation of the break-off shaft 58 in the direction of arrow 60 (see Figure 7) will cause the break-off pin to move into the path of travel of the filament.

The rocker arm 37, anvil mounting lever 54 and break-off shaft 58 are all driven from a single source which is cam drive shaft 61 (Figure 7) supported by a bearing 62 (Figures 3 and 4) mounted on the front end wall 26 of the mounting frame 23 and a bearing 63 mounted on the ledge 29. Mounted on the back end of the cam drive shaft 61 is a bevelled gear 64 meshing with another bevelled gear 65 secured to the rocker arm actuating shaft 39. As seen in Figures 3, 5 and 6 cam 66 is secured on the cam drive shaft 61 adjacent anvil mounting lever 54 and engages a follower 67 (Figure 6) which is secured to lever 54. A spring 68 is connected to a pin 68a on the mounting lever 54 and to a side wall 24 of the mounting frame 23 to hold the follower 67 against the cam 66 which is so shaped as to reciprocate the anvil 53 back and forth under the path of the filament 13. Adjacent the front end of the cam drive shaft 61 but spaced therefrom is a wheel 69 (Figure 3) having a hub 69a and a radial flange 69b. Mounted on the hub 69a and against the flange 69b is a cam 70 having a single projection 70a (Figures 2 and 7). Referring to Figure 2 the flange 69b of the wheel 69 has a plurality of circumferentially spaced arcuate shaped slots 69c and bolts 71 extend through each slot 69c and holes in the cam 70; nuts 71a threaded thereon make the cam adjustable.

A follower 72 secured to the front end of the break-off shaft 58 by an arm 73 (Figures 3 and 7) rides on the cam 70 and is eccentric to the axis of the break-off shaft 58 on the side thereof opposite to the break-off pin 59 so that when the follower 72 is lifted up as viewed in Figure 3 the break-off pin 59 will move down. A spring 74 is connected to the arm 73 and to a pin 75 extending from the front of wall 26 to hold the follower 72 against the cam 70. Secured to the front end of cam drive shaft 61 is a bevelled gear 76 which meshes with a bevelled gear 77 on the drive shaft 78 (Figures 1 and 3). Drive shaft 78 is supported on the base plate 10 by bearings 79 and 80 (Figure 1) and is driven by motor 14 through gears 81 and clutch 82. Through this clutch the cutter mechanism 11 may be stopped without stopping the filament feeding mechanism 12. A hand wheel 83 is attached to one end of the drive shaft 78 to activate the cutter mechanism 11 by hand if desired.

To operate the machine filament 13, previously processed in any desired manner is fed, between rollers 15 (Figure 1) which drive it through the cutter mechanism 11. Here the filament first passes through guide 56 as may be seen more clearly in Figures 6 and 7 and is guided over anvil 53 which reciprocates thereunder as indicated by arrow 84 in Figure 4; such motion is across the path of the scoring tool 46. The reciprocating and pivoting movement of the rocker arm 37 causes scoring tool 46 to travel in a substantially egg-shaped path. Thus in the forward part of its travel scoring tool 46 is moving in the same direction as the filament as well as transversely thereto. More particularly, the speed of the tool in the direction of filament movement, caused by the pivoting of arm 37 about pin 33, is such that as the tool crosses and recrosses the filament it is moving with the filament and at about the same speed. Thus, the stroke of the rocker arm 37 is adjusted so that the tool 46 will cross and recross the filament at the same point on the forward and return strokes; this results in a single score mark for each cycle of the scoring tool across the filament. The height of the scoring tool may be adjusted by screw 48 so that the bottom edge of the tool is slightly below the uppermost surface of the filament passing over anvil 53. The course of movement of the scoring tool and the timing sequence of various parts described results in the formation of a series of equally spaced score marks in the filament as it feeds towards the end of the anvil 53.

Figure 7:
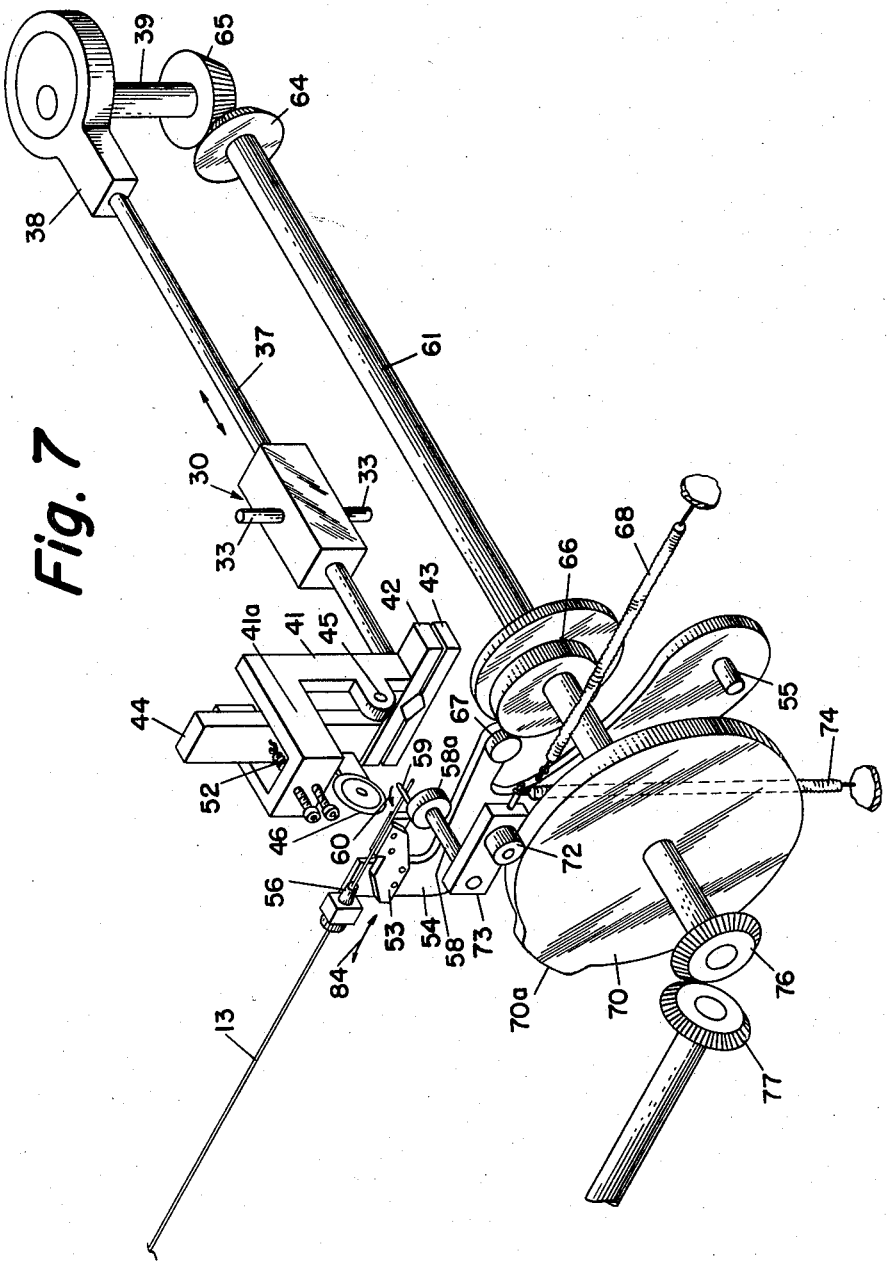
Figure 7 is a schematic perspective view of the working parts of the machine shown in Figure 3.

Referring to Figure 7 cam 66 is set so that during each stroke anvil 53 reaches a maximum speed which is substantially that of the filament as each scoring mark reaches the end of the anvil. These various movements are timed so that there is a momentary pause in the relative movement between the anvil and filament just as each score mark reaches the end of the anvil and is ready for snap severance. As diagrammatically indicated in the Figures 8 and 9, when each score mark 13a reaches the end edge 53a of anvil 53 (Figure 8) the break-off cam 70 trips follower 72 to move break-off pin 59 against the filament (Figure 9) to snap sever the filament at the score mark 13a, the edge of the anvil acting as a fulcrum therefor. This action is timed sequentially and is accomplished without interrupting the constant feeding of the filament through the machine. Accordingly a series of short filament lengths may be formed with facility and on a high precision basis.

To change the length of the filament being cut it is necessary to change the speed of the filament with respect to the transverse speed of the scoring tool 46, to change the eccentricity of scoring tool operating eccentrics and the position of the pivotal bearing 30 so that the scoring tool will have a longitudinal speed the same as that of the filament. Also the anvil operating cam 66 must be adjusted to give the anvil 53 the same speed as the filament during a part of its stroke and finally the position of the break-off cam 70 must be changed so that the break-off pin 59 will operate at the proper time. The speed of the filament 13 can be changed by means of the variable drive device 21. The position of the pivotal bearing 30 is adjusted by sliding it along guide rails 35 and tightening set screws 36 to hold the bearing at the desired position.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for severing frangible filaments while moving longitudinally at a predetermined lineal speed comprising the combination of a scoring tool disposed on the upper side of the path of such filament and slightly below the upper edge of the filament for partial interception of such filament, means for moving said tool across the top of and longitudinally with such moving filament to form a transverse score mark thereon, means for engaging the scored filament to snap sever it at the score mark, an anvil beneath the filament path to support the moving scored filament, means pivotally supporting said anvil for motion along the filament path, and means for moving the anvil along the path at the same speed as the moving filament with the leading edge of the anvil in the vicinity of the score mark until the scored filament is severed so that the anvil acts as a fulcrum in the snap severance of the scored filament.

2. Apparatus for severing frangible filaments while moving longitudinally at a predetermined lineal speed comprising the combination of frame means, a scoring tool mounted on the frame means to one side of the path of such moving filament and slightly below the upper edge of the filament for partial interception of such filament, means for moving said tool across one side and longitudinally with such moving filament to form a transverse score mark thereon, a break-off pin movably mounted on the frame means above the path of the moving filament to be moved laterally into the latter, means for moving said break-off pin laterally against the moving scored filament to snap sever it at the score mark, an anvil below the path for engagement of the moving filament, means pivotally supporting said anvil on said frame for swinging along the path, and means for swinging the anvil along the path at the same speed as the moving filament with the leading end of the anvil beneath the score mark until the scored filament is severed so that the anvil sets as a fulcrum for the scored filament in the snap severance thereof by said pin.

References Cited in the file of this patent

UNITED STATES PATENTS

| | | |
|---|---|---|
| 687,162 | Mahony | Nov. 19, 1901 |
| 1,220,201 | Danner | Mar. 27, 1917 |
| 2,157,067 | Brown et al. | May 2, 1939 |
| 2,447,962 | Schwalbe | Aug. 24, 1948 |

FOREIGN PATENTS

| | | |
|---|---|---|
| 663,910 | France | Apr. 15, 1929 |